US011768830B1

(12) United States Patent
Brahmadesam et al.

(10) Patent No.: US 11,768,830 B1
(45) Date of Patent: Sep. 26, 2023

(54) MULTI-WIRE PROTOCOL AND MULTI-DIALECT DATABASE ENGINE FOR DATABASE COMPATABILITY

(71) Applicant: Amazon Technologies, Inc., Seattle, WA (US)

(72) Inventors: Murali Brahmadesam, Bengaluru (IN); Suprio Pal, Redmond, WA (US); Korry Allen Douglas, Kents Store, VA (US); Jan Wieck, Willow Grove, PA (US); Stefano Stefani, Issaquah, WA (US); Richard Shawn Bice, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 273 days.

(21) Appl. No.: 17/105,919

(22) Filed: Nov. 27, 2020

(51) Int. Cl.
*G06F 16/242* (2019.01)
*G06F 9/54* (2006.01)
*G06F 16/2455* (2019.01)
*H04L 9/32* (2006.01)
*H04L 67/141* (2022.01)
*H04L 67/1097* (2022.01)

(52) U.S. Cl.
CPC .......... *G06F 16/2443* (2019.01); *G06F 9/546* (2013.01); *G06F 16/2455* (2019.01); *H04L 9/321* (2013.01); *H04L 67/1097* (2013.01); *H04L 67/141* (2013.01)

(58) Field of Classification Search
CPC .. G06F 16/2443; G06F 9/546; G06F 16/2455; H04L 9/321; H04L 67/1097; H04L 67/141
See application file for complete search history.

(56) References Cited

U.S. PATENT DOCUMENTS

| 2007/0088838 | A1* | 4/2007 | Levkovitz | G06Q 30/02 709/228 |
| 2010/0185645 | A1* | 7/2010 | Pazdziora | G06F 16/242 707/E17.07 |
| 2014/0330899 | A1* | 11/2014 | Franco | G06F 8/33 709/203 |
| 2016/0328442 | A1* | 11/2016 | Waas | G06F 16/252 |
| 2017/0161033 | A1* | 6/2017 | Darcy | G06F 8/41 |
| 2021/0133183 | A1* | 5/2021 | Biswas | G06F 16/21 |

\* cited by examiner

*Primary Examiner* — Mark D Featherstone
*Assistant Examiner* — Kweku William Halm
(74) *Attorney, Agent, or Firm* — Nicholson De Vos Webster & Elliott LLP

(57) ABSTRACT

Techniques for implementing a multi-wire protocol and multi-dialect database engine are described. A database engine exposes multiple interfaces in the form of ports that support different database wire protocols. The database engine supports multiple query dialects that can be passed over any one of the supported wire protocols. The database engine can support multiple different query dialects within a single database session.

20 Claims, 8 Drawing Sheets

US 11,768,830 B1

MULTI-WIRE PROTOCOL AND MULTI-DIALECT DATABASE ENGINE FOR DATABASE COMPATABILITY

BACKGROUND

Database migration is a complex, multiphase process, which usually includes assessment, database schema conversion (when the database engine is being changed), script conversion, data migration, functional testing, performance tuning, and many other steps. Although various tools exist to automate some these phases, the entire database migration process still remains a lengthy and error-prone process. As a result, many users—and especially those who have older "legacy" applications reliant on older databases—may not be able to perform a migration due to being unable to commit the tremendous time and personnel resources needed for rewriting large portions of their applications for use with a more modern database engine.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for implementing a multi-wire protocol and multi-dialect database engine. According to some embodiments, a single database engine includes multiple wire-protocol listeners for different databases allowing clients to connect to the engine as if it were any one of the multiple different databases. A client may connect to the database engine on a port associated with one of the different databases and create a session using a structured query language (SQL) dialect corresponding to that database. A parser of the database engine is configured to understand the different functions and formats of the supported SQL dialects, and may optionally use one or more compilers/interpreters of any supported SQL dialect for advanced functionalities, e.g., involving stored objects such as stored procedures or functions. Accordingly, the database engine may utilize a single "back-end" database type while allowing clients to interact with the database using protocols/dialects associated with that database type or with one or more other supported database types. In some embodiments, clients may create a database session via by connecting through a port associated with a particular wire-protocol listener and may use the corresponding SQL dialect and/or change to another supported SQL dialect within the same session, which may allow for a gradual migration or use of advanced features provided by a different engine than the application is primarily written for.

Figure 1:
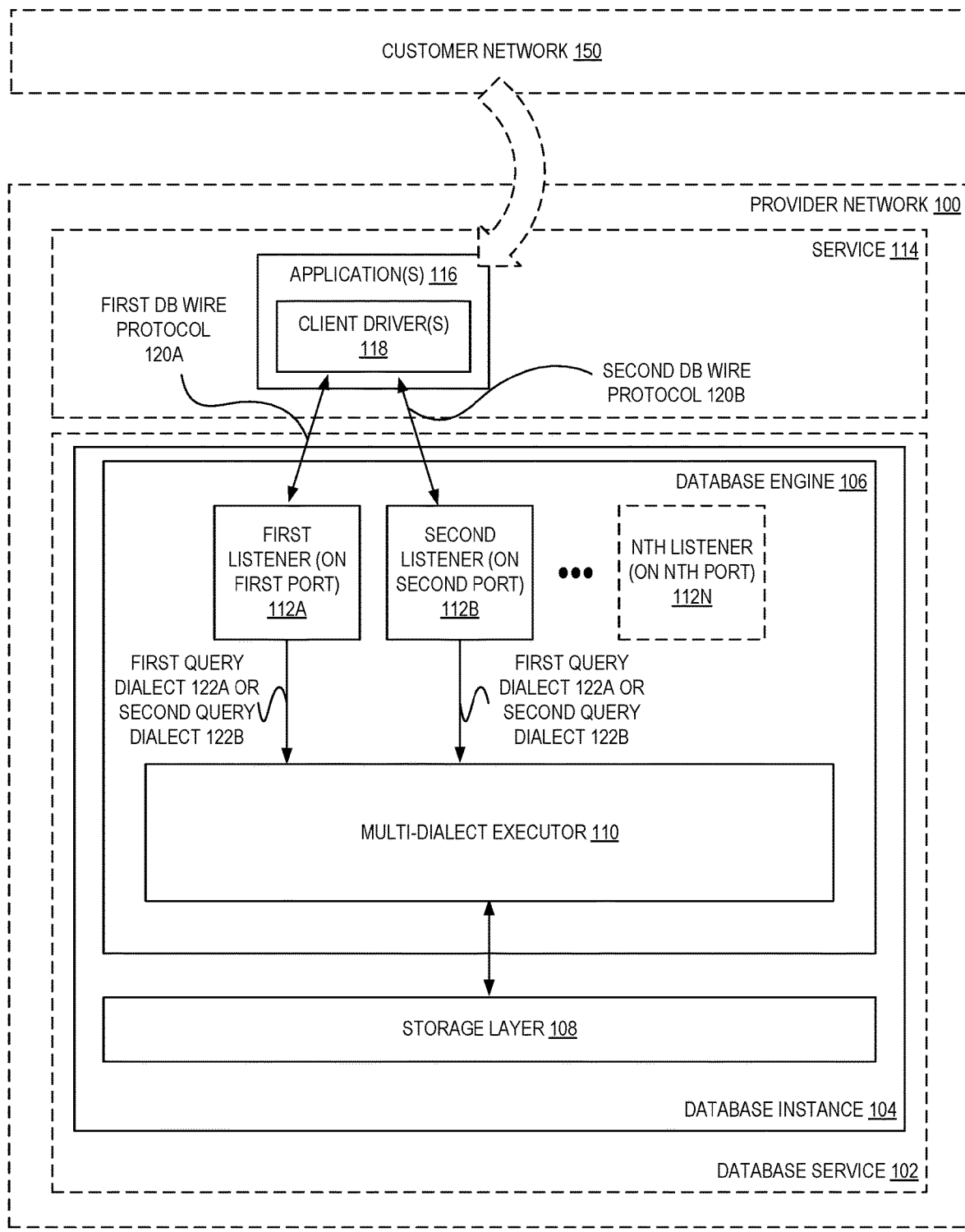
FIG. 1 is a diagram illustrating an environment including a multi-wire protocol and multi-dialect database engine according to some embodiments.

FIG. 1 is a diagram illustrating an environment including a multi-wire protocol and multi-dialect database engine according to some embodiments. FIG. 1 includes a database instance 104 shown as including a storage layer 108 (though this may be distinct from the database engine 106 in various embodiments) and a database engine 106. The database instance 104 may be implemented as software executed by one or multiple computing devices, and the storage layer 108 may be implemented on the same one or multiple computing devices or by a separate one or more computing devices (e.g., accessible via a network connection or other physical interface). This database instance 104 may provide database functionalities to one or more applications 116 through one or more client drivers 118.

Generally, many types of modern computing applications rely on databases, and in particular, relational databases. Countless types of computing applications (e.g., application 116), such as analytics software, mobile application backends, customer relationship management systems, and so on, may be implemented within a provider network 100 using one or more compute-type services 114 such as a hardware virtualization service or serverless code execution service, or in another location by one or more computing devices (e.g., by applications executing in a data center or "on-premise" at a user's location, and/or by applications executed by "client" devices such as personal computers, smart devices, mobile devices, etc.). At some point, these computing applications may use database functionality provided by one or more database instances 104 (e.g., provided by a database service 102, executed as a standalone database within a hardware virtualization service, etc.) by sending messages carrying database statements (e.g., Structured Query Language (SQL) statements) to the database instance(s) 104, which can perform operations in response and optionally send back database results (e.g., status indicators, data stored by a database, data generated based on data stored by the database storage layer responsive to a query, etc.). In this manner, the computing applications act as a "client" by requesting the database instance(s) 104 to perform some operation(s) and thus act as a "server."

Many organizations of all sizes have sought to migrate their database-backed workloads (e.g., large-scale enterprise applications to small special-purpose applications) into the cloud. However, many of these applications rely on either outdated databases that are no longer supported or provided in clouds, or on expensive databases requiring substantial licensing fees.

As a result, some systems have been developed exist to migrate from one database to another. However, they do not work well for many migrations as the landscape of a database-backed application is huge. Moreover, many different SQL dialects exist, and database vendors have produced many of their own extensions to differentiate themselves, and various users use various ones of these custom features. Further, many portions of an application's code are actually running on the database, e.g., as code implemented as stored procedures, triggers, etc., and these stored objects are implemented in different ways by different databases. Additionally, as applications are typically separated from their databases, there are many different network protocols involved between database clients and servers that are all significantly different.

Thus, to migrate an application to utilize a new database, all of these issues need to be addressed for the application—e.g., language elements of the particular dialect (SQL syntax, stored objects, etc.) must be dealt with, typically by rewriting code to update queries and result processing, and further application-level compatibility (e.g., using special-purpose driver from a particular vendor) for speaking a specific network wire protocol must be addressed. Embodiments disclosed herein can address both issues, often without any (or without any substantial) rewriting of the application code, via use of original database client drivers, etc., allowing database migration via a "drop-in" replacement.

In some embodiments, a database instance 104 is an isolated database environment running in the provider network 100, and may contain one or multiple user-created databases that can be accessed using the same client tools and applications that are used to access standalone database instances. A database instance 104 may have a database instance identifier, which can be a user-supplied name that uniquely identifies (e.g., within the entire provider network 100, or within a portion or region of the provider network 100) the database instance 104 during interactions between the user and the database service 102 interface(s).

A database instance 104 may include a database engine 106. For example, a database service 102 may support a number of database engines, including but not limited to MySQL, MariaDB, PostgreSQL, Oracle, Microsoft SQL Server, Amazon Aurora, etc. In some embodiments, the database service 102 may support one or more NoSQL databases, one or more object database management systems, one or more object-relational database systems, one or more data warehouse systems (e.g., Amazon Redshift), a "serverless" interactive query service, or the like. Interactions with a database instance(s) 104 may be performed via use of database statements (e.g., queries, commands, or the like) that may adhere to a defined query language (as defined by a query language definition), such as one or more of the many dialects, extensions, and implementations of SQL, like Transact-SQL (T-SQL), Procedural Language/SQL (PL/SQL), PL/pgSQL (Procedural Language/PostgreSQL), SQL-86, SQL-92, SQL:2016, etc.

The databases described herein may, in some embodiments, be distributed databases. For example, a database may be implemented using a database cluster made up of one or more database instances and a cluster volume (itself made up of one or more storage nodes) that manages the data for those database instances. A cluster volume may be a virtual database storage volume that spans multiple availability zones (e.g., of a cloud provider network), with each availability zone having a copy of the database cluster data. As described in further detail herein, a cloud provider network can be formed as a number of regions, where a region is a geographical area in which the cloud provider clusters data centers, and where each region includes multiple (e.g., two or more) availability zones (AZs) connected to one another via a private high-speed network that each provides an isolated failure domain including one or more data center facilities with separate power, separate networking, and separate cooling from those in another AZ.

In some embodiments, two types of database instances may make up a database cluster—"primary" database instances and "replica" database instances. A primary database instance may support both read and write operations and perform all of the data modifications to the cluster volume. In some embodiments, each database cluster has one primary database instance. The database cluster may also include one or more replica instances. A replica database instance connects to the same storage volume as the primary database instance but may support only read operations. Each database cluster may have multiple replicas (e.g., up to fifteen) in addition to the primary database instance. Users may thus use these multiple replicas to maintain high availability by locating the replica instances in separate availability zones. In some embodiments, the database may automatically fail over to a replica (as a new/temporary primary instance) if the primary database instance becomes unavailable. In some embodiments, ones of the replica instances can also offload read workloads from the primary database instance. In some embodiments, the database may use multi-primary (or multi-master) configurations where multiple (or all) database instances of the cluster have the capability to both read and write.

Most database products support their own variant (or dialect) of SQL. Thus, a database instance would support one specific query language dialect defined by the vendor/creator of the database. For example, a Microsoft SQL Server database supports its own dialect, Transact-SQL (T-SQL), which is a proprietary extension to SQL that expands on the SQL standard to include procedural programming, local variables, various support functions for string processing, date processing, mathematics, changes to the DELETE and UPDATE statements, etc. Transact-SQL is central to using Microsoft SQL Server, as applications that communicate with an instance of SQL Server do so by sending Transact-SQL statements to the server, regardless of the user interface of the application.

Similarly, many Oracle databases support PL/SQL (Procedural Language for SQL), which includes procedural language elements such as conditions and loops, allows declaration of constants and variables, procedures and functions, types and variables of those types, triggers, etc. Further, the PostgreSQL database supports PL/pgSQL (Procedural Language/PostgreSQL), which as a fully featured programming language allows much more procedural control than SQL, including the ability to use loops and other control structures, use SQL statements and triggers to call functions created in the PL/pgSQL language, etc. Accordingly, many different databases exist that commonly have an associated SQL dialect that they support.

As shown, the database instance 104 and/or the applications 116 may optionally be implemented within a provider network 100. A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

Thus, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance(s) involved. As indicated herein, such functionalities are typically provided as services.

For example, in FIG. 1 the one or more applications 116 may be implemented via a service 114 of the provider network such as an on-demand code execution service, hardware virtualization service, or the like. An on-demand code execution service (referred to in various embodiments as a function compute service, functions service, cloud functions service, functions as a service, or serverless computing service) can enable customers of the provider network 100 to execute their code on cloud resources without having to select or manage the underlying hardware resources used to execute the code. For example, a customer may be able to user the on-demand code execution service by uploading their code and using one or more APIs to request that the service identify, provision, and manage any resources required to run the code. As another example, a hardware virtualization service (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine, one type of "instance"), for example using a hypervisor, which may run at least on an offload card of the server (e.g., a card connected via PCI or PCIe to the physical CPUs) and other components of the virtualization host that may be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like. Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

As shown, in some embodiments, a database instance 104 is implemented with support for multiple "wire" protocols as well as multiple different query dialects. This database instance 104 can support a variety of different client drivers 118/applications 116 (e.g., ones written for a first type of database or a second type of database) that may use different wire protocols and/or different query dialects. In this manner, applications 116 reliant on a particular database (which may be a legacy-type database, or one disfavored by the user) can easily be migrated (e.g., from a customer network 150, from within the provider network or another provider network, etc.) to use this database instance 104 in a "drop in" (or, "lift and shift") manner—the application can continue using its own wire protocol as well as the query dialect it is written to use, and over time the application can be extended or reconfigured to use some features of a different (e.g., preferred, modern, etc.) database through use of a different query dialect and/or use of database-specific functionalities provided by the different database. For example, different database functionalities provided by a newer type of database may be used by the legacy application by adapting the code to simply switch the database session, for as long as needed, to use of a different dialect and issuing the desired database statements (e.g., using functions or features supported by the new database but not the existing one, such as advanced processing functionalities, the use of different datatypes, the use of machine learning, or the like) using that new database's supported query dialect, which will be processed by the same database engine 106 using the same underlying data of the storage layer 108. After performing these functionalities, the code may simply switch the database session back to use of the previous query dialect, allowing the remainder of the application to continue interacting with the database using its existing code and thus, the existing query dialect. In this manner, a user may switch an existing application reliant on an existing database type (e.g., Microsoft SQL Server) over to a new multi-protocol multi-dialect database engine (e.g., supporting both Microsoft SQL Server and also a PostgreSQL or similar type of database engine) that supports the application's currently-used wire protocol (e.g., TDS), dialect (e.g., T-SQL), stored objects, etc. Over time, the user may reconfigure portions of the application to use a different dialect (e.g., PL/PgSQL), functionalities, and optionally different wire protocol (e.g., FE/BE), while still operating on the same underlying data.

Accordingly, the database engine 106 is adapted with different "wire protocol" listeners 112A-112N corresponding to different database messaging protocols. A wire protocol, for example, may be an application-layer database message exchange protocol such as the Frontend/Backend Protocol (FE/BE) used by PostgreSQL. FE/BE is a message-based protocol for communication between frontends and backends, e.g., clients and servers. This protocol is supported over TCP/IP and also over Unix-domain sockets. Port number 5432 has been registered with IANA as the customary TCP port number for servers supporting this protocol, but in practice any non-privileged port number can be used. Another example of an application-layer database message exchange protocol is the Tabular Data Stream (TDS) protocol that is well-known as being used by Microsoft SQL Server and earlier by Sybase SQL Server. Similarly, databases from Oracle Corporation use a proprietary application-layer database message exchange protocol via their Oracle Net network stack, whereas versions of the MySQL database use a protocol simply called the MySQL protocol. It is understood that these particular database wire protocols are exemplary, and other such protocols (e.g., built over TCP/IP) of these and other databases may similarly be used in various embodiments. In the example of FIG. 1, at least a first listener 112A of a wire protocol (on a first port, e.g., commonly used for that wire protocol) and a second listener 112B of another wire protocol (on a second port, e.g., commonly used for that wire protocol) are implemented by the database engine 106, though additional listeners for additional listeners 112N may further be implemented. Each of the listeners 112A-112N includes code for communicating with clients according to the associated wire protocol to set up connections, sessions, perform authentication (e.g., verify proper usernames, passwords), authorization (e.g., check permissions for a given user), and the like. A listener may also support, for example, management setup for batch query processing, management associated with "prepare" execution statements, management pertaining to user-defined functions, cursors, transactions, and the like.

In this manner, the listeners 112 and multi-dialect executor 110 can allow for the benefit of connection/session management within a same database server and further, for taking advantage of the query compilation/execution capabilities of the database engine without resorting to being a transpiler (e.g., a source-to-source compiler).

In some use cases, a client driver 118 connected to the database engine 106 via one of the listeners 112A-112N may send, via those messages, database statements (e.g., queries, statements, commands such as function or trigger invocations, etc.) formatted according to a query dialect supported by the same type of database that uses that wire protocol. For example, a client driver 118 for the Microsoft SQL Server (e.g., Microsoft JDBC driver for SQL Server, .NET Data Provider for SQL Server) may connect to a listener (e.g., a TDS listener) via a port (e.g., 1433) associated with that database and may send SQL statements formatted according to T-SQL, for example.

However, in some embodiments, a client driver 118 connected to the database engine 106 via one of the listeners 112A-112N may send, via those messages, database statements formatted according to a different query dialect that may not supported by the same type of database that uses that wire protocol. For example, a client driver 118 may similarly connect to a listener (e.g., a TDS listener) via a port (e.g., 1433) commonly associated with the Microsoft SQL Server database but may instead send SQL statements formatted according to another query dialect commonly associated with a different database type (e.g., PostgreSQL), such as PL/pgSQL.

In some embodiments the application 116/client driver 118 may switch between dialects by issuing a special statement, e.g., to "SET SQL_DIALECT=$VALUE" (or a similar syntax) where $VALUE represents a reserved value (e.g., a string, integer, etc.) that indicates a particular dialect sought to be used. Thus, the application 116 may primarily make use of a first dialect (e.g., one that it was coded for), but briefly switch over to use a different dialect (e.g., of a "new" database providing different functionalities) as desired, and optionally switch back to use of the first dialect. Accordingly, legacy applications can continue functioning with their legacy code, and can slowly be updated to use a more modern database, and/or just be modified in a few select places to use a new database dialect, on demand, with the same underlying data.

These statements may then be passed to the multi-dialect executor 110, which is adapted to parse and process multiple different query dialects, e.g., by generating a query execution plan, which may involve calling specific compilers/interpreters, and then executing the plan. Thus, for a particular dialect, the multi-dialect executor 110 may be able to handle data types specific to the dialect, various language features (e.g., for creation of a trigger or procedure or union, batches, configuration parameters, etc.), runtime functions, and the like.

Figure 2:
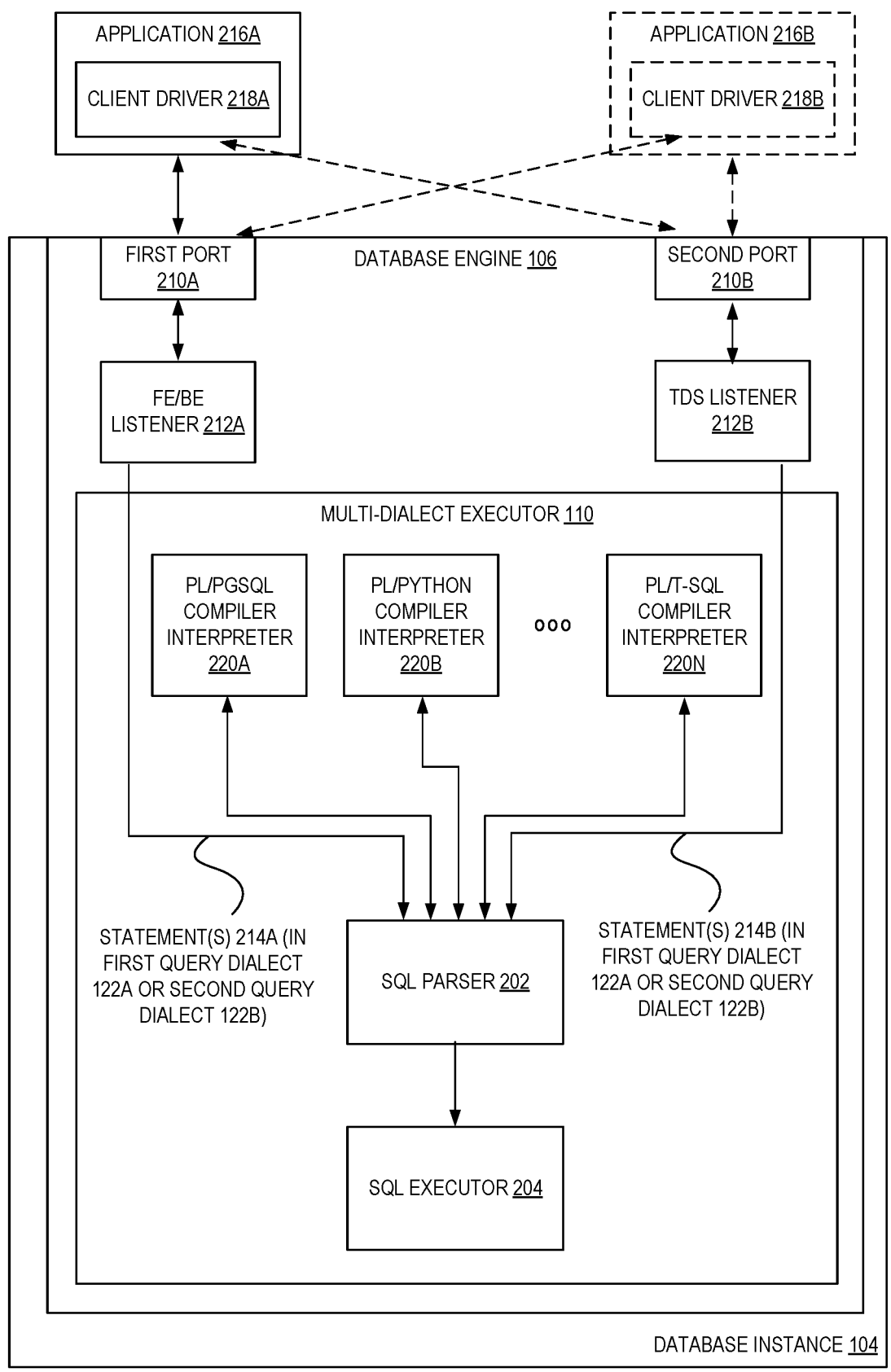
FIG. 2 is a diagram illustrating components of one exemplary multi-wire protocol and multi-dialect database engine according to some embodiments.

For further detail, FIG. 2 is a diagram illustrating components of one exemplary multi-wire protocol and multi-dialect database engine according to some embodiments. In this example, a first application 216A may use a client driver 218A to connect to the database instance 104 at a first port, e.g., port 5432, that a first listener—here, FE/BE listener 212A is handling. Thus, the client driver 218A may be a PostgreSQL-compatible driver used to communicate using the FE/BE wire protocol as well as use a PostgreSQL query dialect for database statements, which are passed on from the FE/BE listener 212A to a SQL parser 202.

The SQL parser 202 may, for example, check a query string (e.g., which arrives as plain text) for valid syntax; when the syntax is correct a parse tree may be constructed, or otherwise an error may be returned. The parser (and/or lexer component) may be implemented using well-known tools, e.g., the Unix tools bison and flex. In some embodiments, the parser thus creates a parse tree using fixed rules about the syntactic structure of its supported dialect of SQL. After the parser completes, a transformation process may take the tree generated by the parser as input and perform the semantic interpretation needed to understand which tables, functions, and/or operators are referenced by the query. The data structure that is built to represent this information is called the query tree. The SQL parser 202 may be adapted to accommodate various syntactical differences between the supported dialects. For example, some dialects use a "TOP" clause to fetch a TOP N number or X percent of records from a table, but other dialects use different constructions, such as the use of "LIMIT" in MySQL, "ROWNUM" in some Oracle databases, and the like. The SQL parser 202 may be adapted to comprehend and process these different dialect specifics.

For dialect/database specific functions or extensions required for execution, the SQL parser 202 may interact with one or more interpreters associated with the dialect. For example, a compiler/interpreter may be implemented as an extension to a database that handles database-specific specifics involving stored object elements, such as stored procedures, triggers, functions, unique datatypes, etc.

For example, the multi-dialect executor 110 may utilize a PL/pgSQL compiler/interpreter 220A to assist with the execution of PL/pgSQL statements, and/or a PL/Python compiler/interpreter 220B to assist with the execution of PL/Python functions or code, etc. As is known to those of skill in the art, the PL/Python procedural language allows PostgreSQL functions to be written in the Python language. Thereafter, the SQL executor 204 may operate on the query tree (and/or other similar, related query-specific data structures) by interacting with the storage layer 108, e.g., to execute complex node plans from an optimizer (not shown) and handle SELECT, INSERT, UPDATE, and DELETE statements (and optionally others). The operations performed by the SQL executor 204 to handle these statement types may include, for example, heap scans, index scans, sorting, joining tables, grouping, aggregates, and uniqueness.

The same application 216A may also choose to switch its database session into use of another dialect (e.g., to execute different operations supported by a different type of database that involve use of a different dialect), and may send statements/queries of that second dialect using the same client driver 218A and the same first wire protocol to the first port 210A and FE/BE listener 212A (which may be a different wire protocol than that typically used by the "different" type of database). In some embodiments, to cause this switch the application 216A may send one or more commands to update a session state variable, e.g., to set a session dialect to a different value corresponding to the desired query dialect. Thereafter, the application 216A may send statements of this other second dialect over the same session, where the SQL parser 202 is adapted to also be able to process statements of this type of dialect, and optionally use other compilers/interpreters associated with this second dialect—e.g., a PL/T-SQL compiler/interpreter 220N that can operate upon certain T-SQL statements (e.g., involving stored objects like stored procedures, triggers, or the like), which here may still use the same underlying data store and/or logic that is associated with a different database type (e.g., PostgreSQL).

In addition to switching a same session between dialects, in some embodiments the application 216A may instead open a new connection and/or session with a second port 210B (e.g., port 1433, to a TDS listener 212B) to be able to utilize the second dialect, which involves use of a separate wire protocol (e.g., TDS). This may require use of a different client driver (not illustrated), but in some embodiments can be useful when an application includes different components written to rely on different backend databases, and/or in embodiments where the database engine 106 is not adapted to accommodate intra-session dialect switching, which can reduce complexity of the underlying database engine 106 code as it need not accommodate such switching.

As shown, it is now possible for multiple applications 216A-216B to use a database instance 104 where each application may use a same or different wire protocol and/or dialect to interact with the same underlying data. Thus, a first application 216A may (predominantly or completely) use a first wire protocol and dialect while a second application 216A may (predominantly or completely) use a second wire protocol and second dialect, without affecting the integrity of the database or each other.

Figure 3:
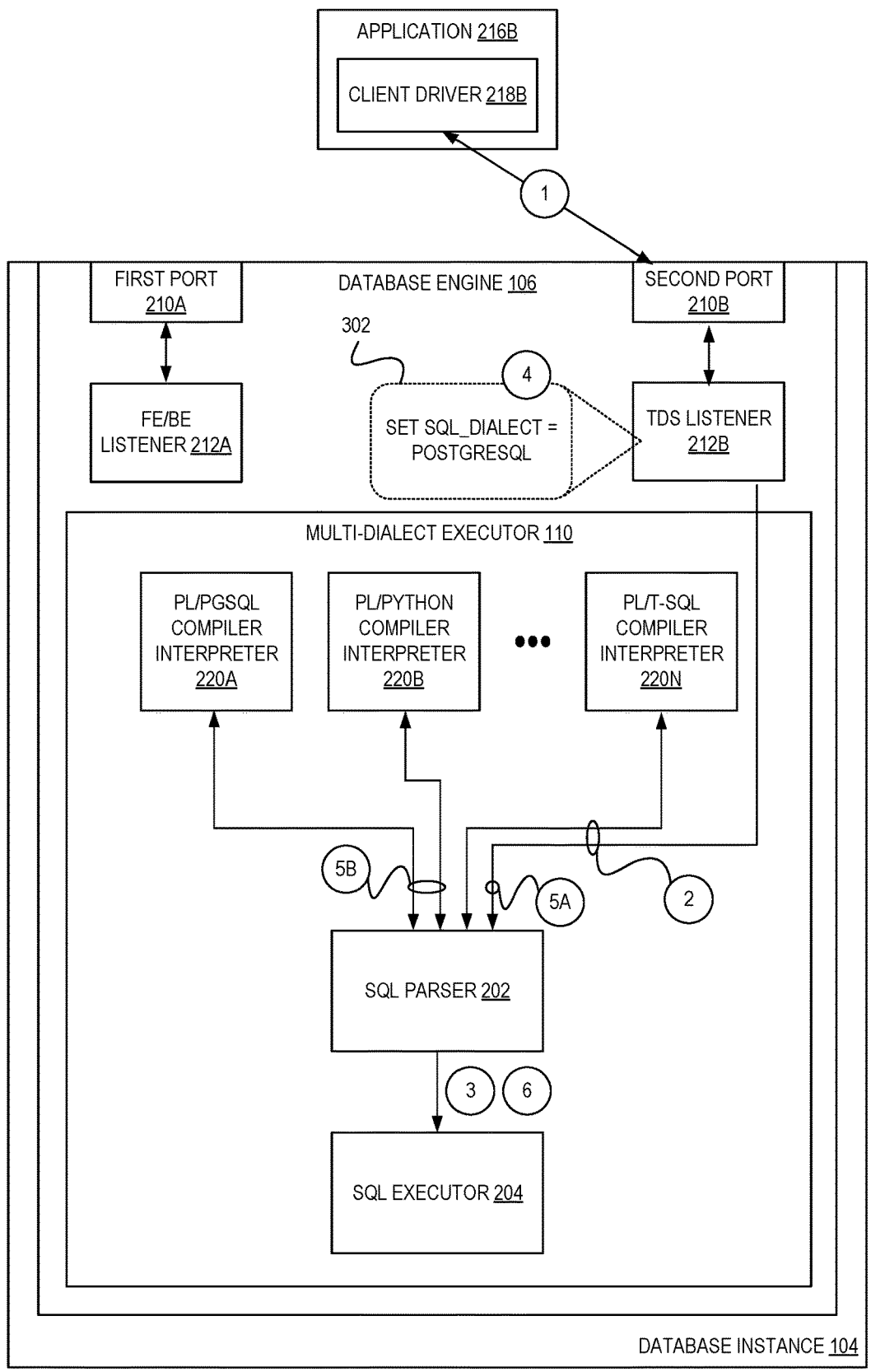
FIG. 3 is a diagram illustrating exemplary intra-session query dialect switching using an exemplary multi-wire protocol and multi-dialect database engine according to some embodiments.

For one specific example, FIG. 3 is a diagram illustrating exemplary intra-session query dialect switching using an exemplary multi-wire protocol and multi-dialect database engine according to some embodiments. In this example, the application 216B may have been written to use a Microsoft SQL Server database, and may use client driver 218B to interact with a TDS listener 212B via a second port 210B as shown at circle (1) to open a database session and send statements in T-SQL as shown at circle (2), which may be processed directly by the SQL parser 202 and/or via use of a PL/T-SQL compiler/interpreter 220N and may involve execution by the SQL executor 204 at circle (3). Thereafter, the application 216B may want to use functionalities provided by the PostgreSQL database, and may switch its session at circle (4), by sending a request 302 to set the SQL_DIALECT to be 'PostgreSQL'. Thereafter, the application 216B may send database statements in that PostgreSQL dialect—but still using the original TDS wire protocol—through the second port 210B and TDS listener 212B to be processed at circle (5A), which may now involve the use of PostgreSQL compiler/interpreters 220A-220B at circle (5B) and/or the SQL executor 204 at circle (6). Thereafter the application 216B may or may not switch back to use of the T-SQL query protocol as needed.

Figure 4:
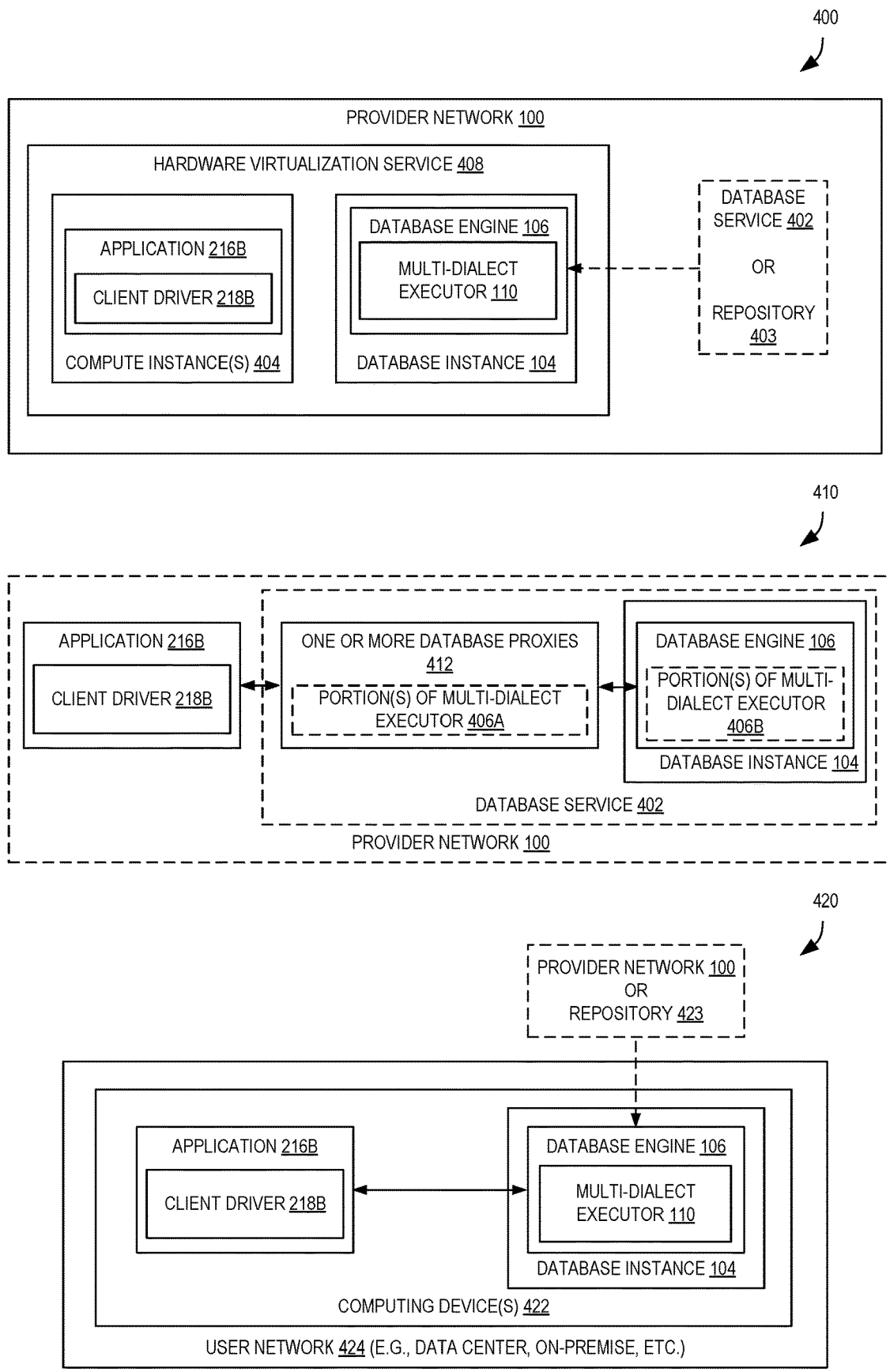
FIG. 4 is a diagram illustrating exemplary deployment possibilities of components of an exemplary multi-wire protocol and multi-dialect database engine according to some embodiments.

Although these examples (such as those in FIG. 1) involve an application and a database instance being executed within a multi-tenant service provider network, there are many other ways to implement these components according to various embodiments. FIG. 4 is a diagram illustrating exemplary deployment possibilities of components of an exemplary multi-wire protocol and multi-dialect database engine according to some embodiments.

In a first example 400, a multi-dialect database engine 160 described herein may be run within a hardware virtualization service 408, e.g., in the form of a virtual machine image, executable, etc., that can be run, launched, or otherwise used to instantiate a database instance 104 for a particular user of the provider network 100. For example, a user may host an application 216B within one or more compute instances 404 (e.g., virtual machines) provided by a hardware virtualization service 408, and may send a request to the hardware virtualization service 408 seeking a particular multi-dialect database instance to be launched. This image may be obtained from the database service 402 in an on-demand manner, or otherwise provided to the hardware virtualization service 408 by the database service 402 such as through a periodic transmission of a latest image, publishing the image to a shared repository 403 or other storage location, etc., that the user and/or hardware virtualization service 408 may access. As another example, a repository 403 may provide a code package (e.g., a database plugin to implement compilers/interpreters, a set of patches to transform a "base" database into a multi-protocol/multi-dialect database described herein, etc.) that can be used to create the database instance 104.

As another example 410, portions of the multi-dialect executor 406A may be deployed within one or more database proxies 412 and thus be separated from other portions of the multiple dialect executor 406B implemented in a database engine 106 of a database instance 104. For example, in some embodiments the database instance 104 itself may be entirely devoted to one type of database—e.g., a PostgreSQL database—and thus the portions of the multi-dialect executor 406B that are implemented in the database instance 104 may be mostly (or entirely) dedicated to that type of database. However, the portions of the multi-dialect executor 406A deployed in the one or more database proxies 412 may include the portions dedicated to one or more other types of databases, and thus may support other wire protocols and/or query dialects. Moreover, in some cases the one or more database proxies 412 may tie or pin particular connections to a particular multi-protocol/multi-dialect database described herein, or even beneficially simply operate in front of the database instance 104 without any specific customizations.

As yet another example 420, a multi-dialect database engine 160 described herein may be provided from the provider network 100 or other repository 423 system, e.g., in the form of a virtual machine image, executable, set of software patches, downloaded plugins or extensions, etc., that can be run, launched, or otherwise used to instantiate a database instance 104 using one or more computing devices 422 within a user network 424 such as a data center, on-premise network, etc., of an organization. For example, a user may download a set of software patches and apply them during a database software build process, and/or may download and install a set of plugins/extensions to the database, to yield a multi-protocol/multi-dialect database described herein.

Figure 5:
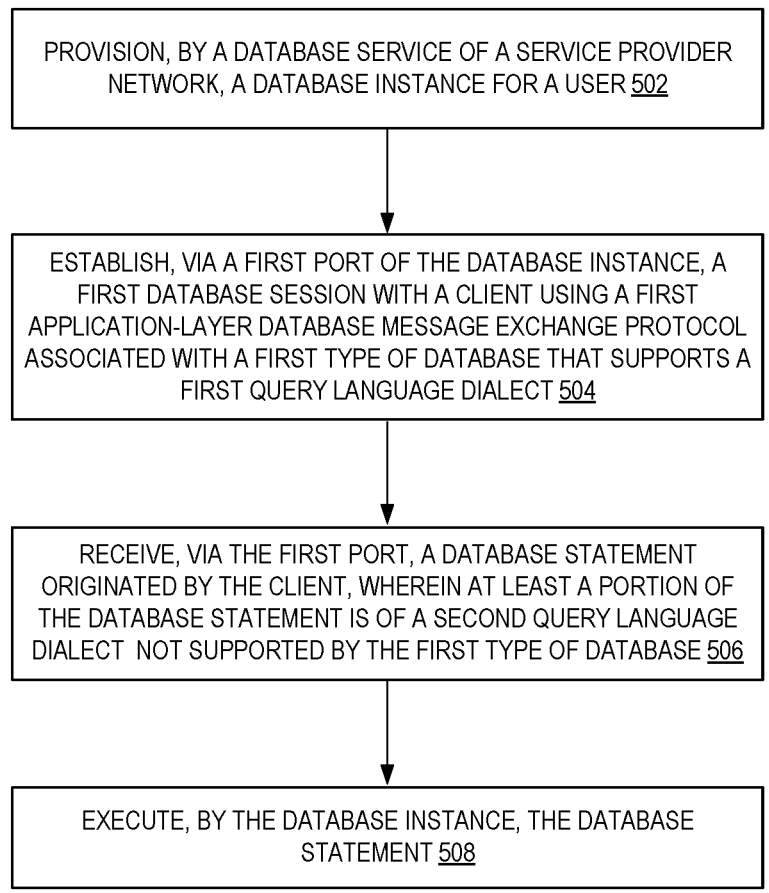
FIG. 5 is a flow diagram illustrating operations of a method for providing multi-wire protocol and multi-dialect database utilization according to some embodiments.

FIG. 5 is a flow diagram illustrating operations of a method 500 for providing multi-wire protocol and multi-dialect database utilization according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by the database instance 104 (in some embodiments, within the database service 102) of the other figures.

At block 502, the operations 500 include provisioning, by a database service of a service provider network, a database instance for a user. The provisioning may occur responsive to receipt of a request originated by a computing device of the user seeking for a database to be launched, which may include the launch of one or multiple database instances. The request may include an identifier indicating that the user desires a multi-protocol multi-dialect database instance to be launched.

The operations 500 include, at block 504, establishing, via a first port of a database instance, a first database session with a client using a first application-layer database message exchange protocol associated with a first type of database that supports a first query language dialect. In some embodiments, the client comprises a client driver utilized by an application of a customer of a service provider network; the application was written to utilize the first type of database and use the first query language dialect; the database instance is executed with the service provider network; and the application was migrated to use the database instance.

The operations 500 further include, at block 506, receiving, via the first port, a database statement originated by the client, wherein at least a portion of the database statement is of a second query language dialect not supported by the first type of database.

The operations 500 further include, at block 508, executing, by the database instance, the database statement. In some embodiments, block 508 includes parsing the database statement based on the set current query language dialect, and in some embodiments, block 508 includes invoking an interpreter engine associated with the set current query language dialect as part of executing at least a portion of the database statement. In some embodiments, the portion of the database statement references a stored object.

In some embodiments, the database statement references a function provided by the second type of database but not the first type of database.

In some embodiments, the operations 500 further include receiving, via the first port as part of the first database session, a second database statement originated by the client, wherein the second database statement is of the first query language dialect; and executing, by the database instance, the second database statement.

The operations 500 further include, in some embodiments, establishing, via a second port of the database instance, a second database session using a second application-layer database message exchange protocol associated with a second type of database that supports the second query language dialect.

In some embodiments, the operations 500 further include receiving, via the second port as part of the second database session, a third database statement of the second query language dialect; and executing, by the database instance, the third database statement.

In some embodiments, the operations 500 further include receiving a command originated by the client indicating a request to set a current query language dialect, for the first database session, to one of the first query language dialect or the second query language dialect.

In some embodiments, the database instance includes: a first listener component implementing the first application-layer database message exchange protocol via the first port; a second listener component implementing a second application-layer database message exchange protocol via a second port; at least a first interpreter engine associated with the first type of database; at least a second interpreter engine associated with the second type of database; a parser; and an executor.

Figure 6:
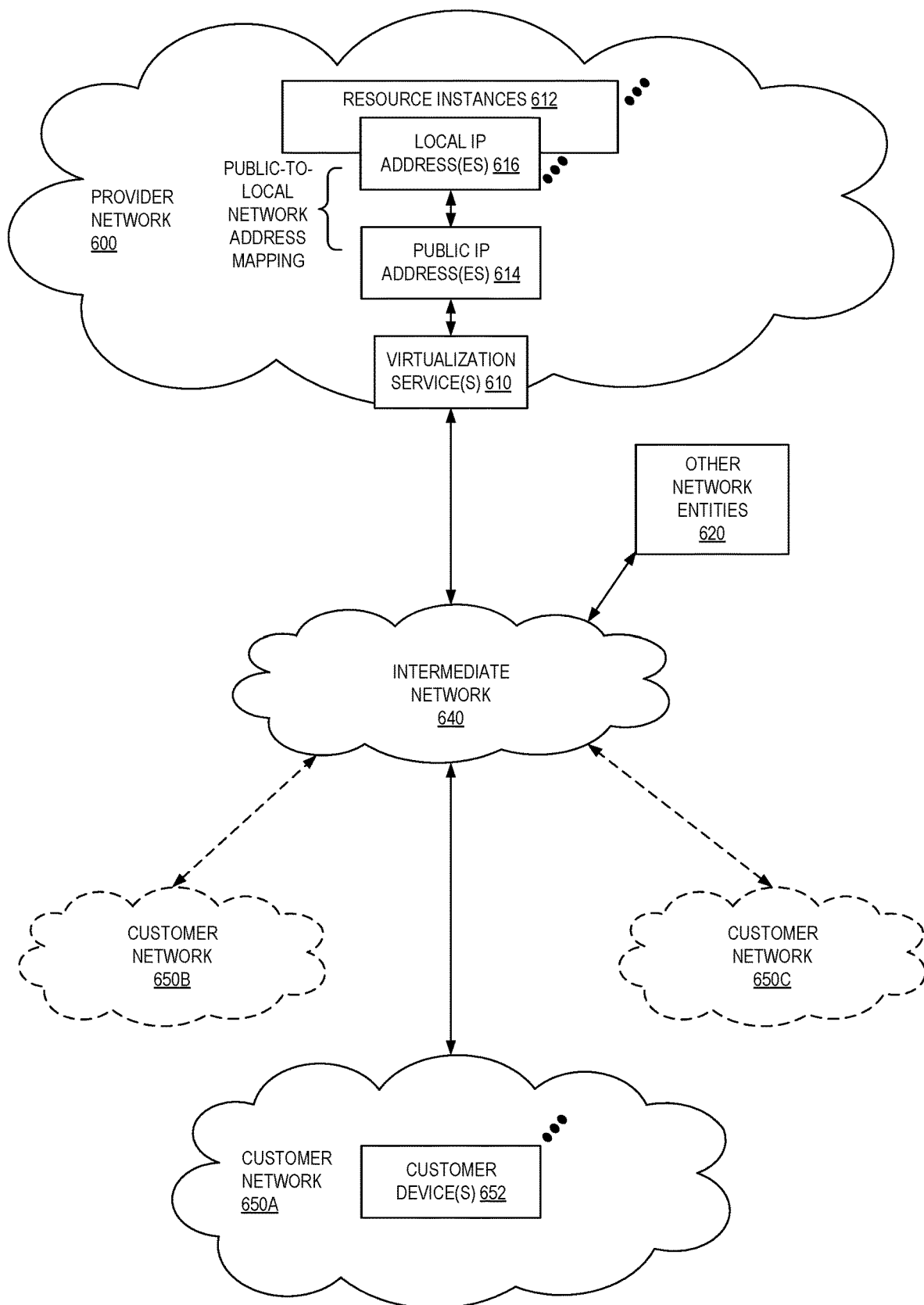
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
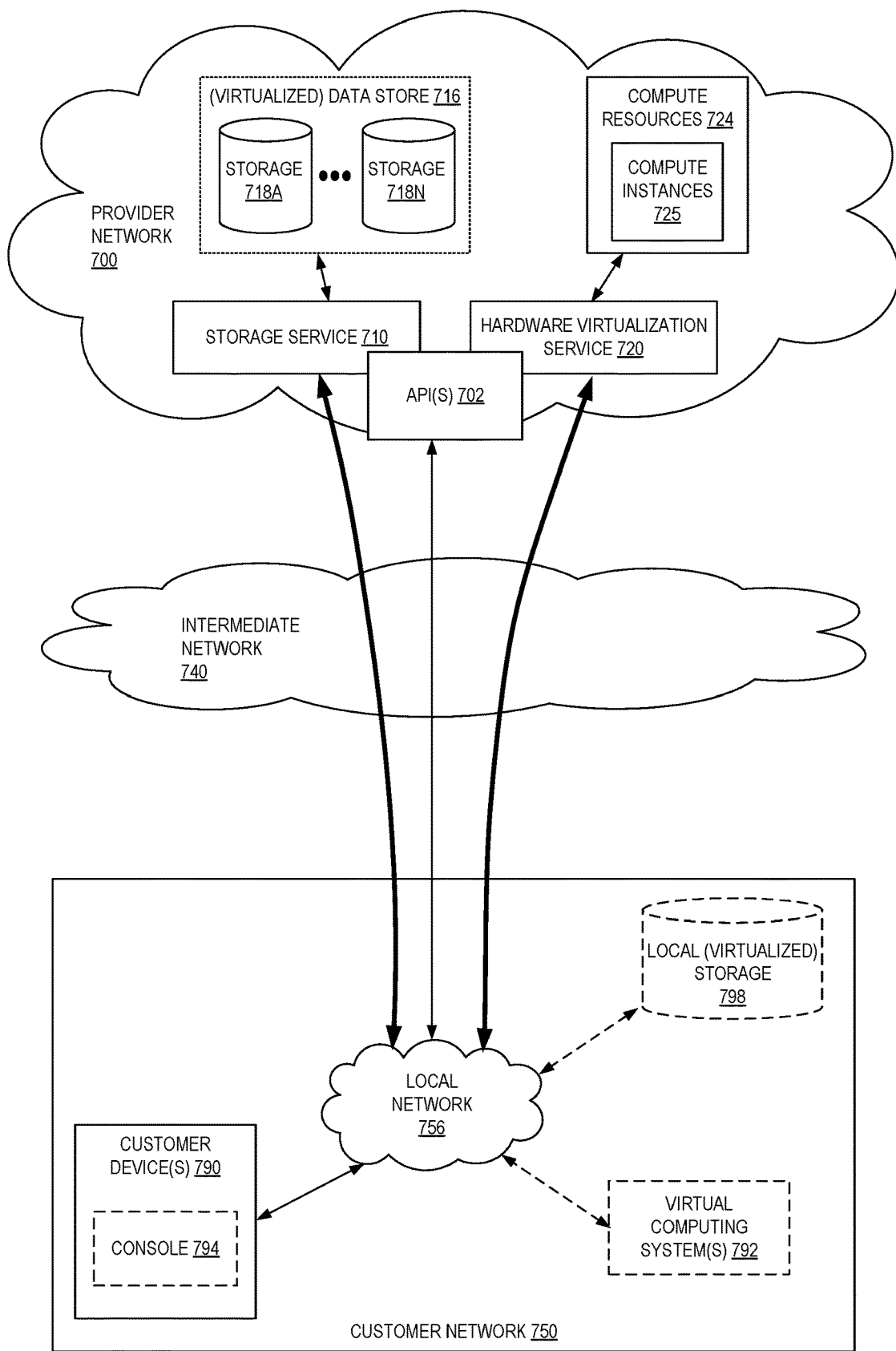
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple compute resources 724 (e.g., compute instances 725 such as VMs) to customers. The compute resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the compute resources 724 to public Internet destinations, and from public Internet sources to the local IP addresses of compute resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative Systems

Figure 8:
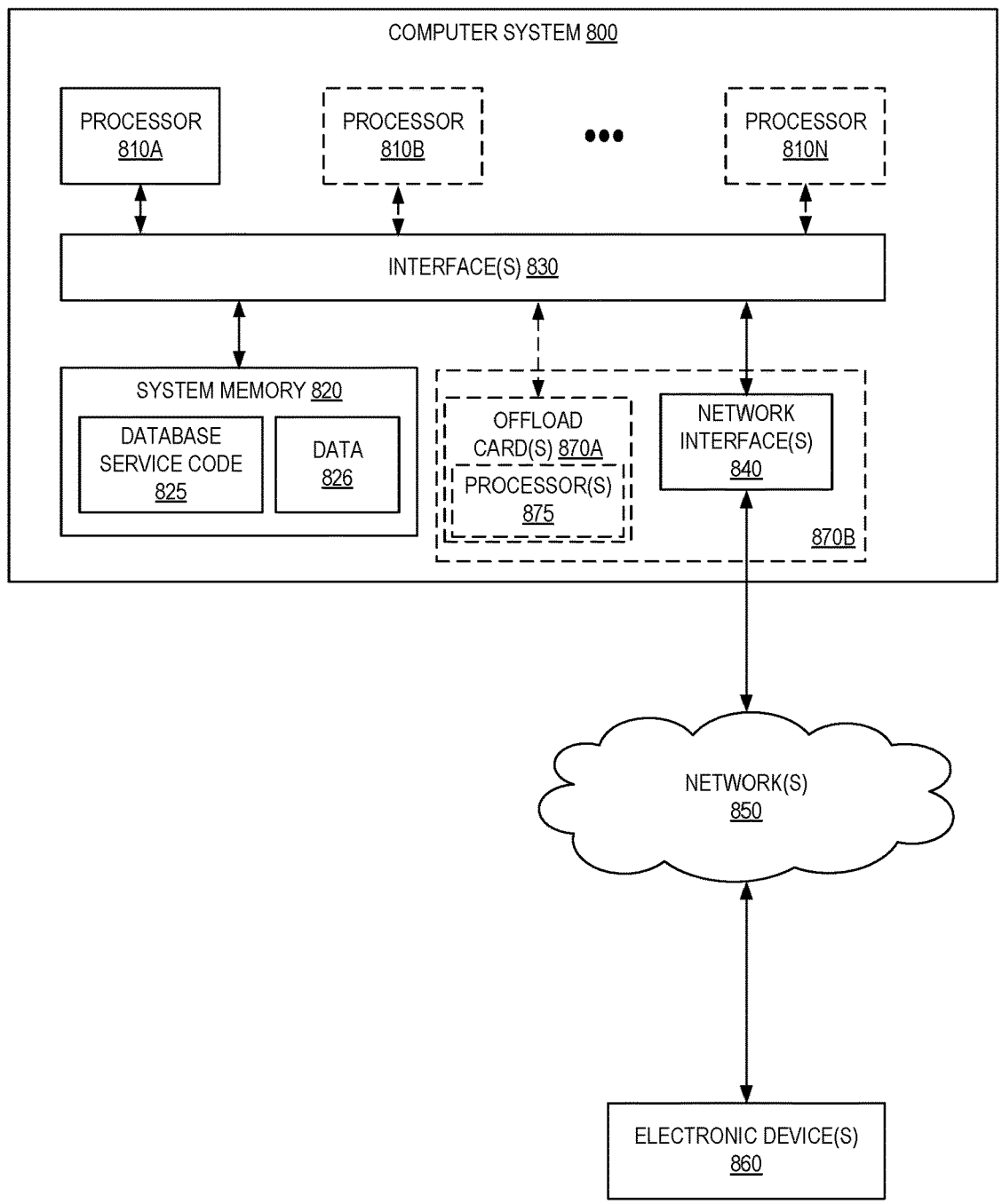
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as database service code 825 (or database engine code) (e.g., executable to implement, in whole or in part, the database service 102 or database engine 106) and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870A or 870B (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute resources such as compute instances, and the one or more offload cards 870A or 870B execute a virtualization manager that can manage compute instances that execute on the host electronic device.

As an example, in some embodiments the offload card(s) 870A or 870B can perform compute instance management operations such as pausing and/or un-pausing compute instances, launching and/or terminating compute instances, performing memory transfer/copying operations, etc. These management operations may, in some embodiments, be performed by the offload card(s) 870A or 870B in coordination with a hypervisor (e.g., upon a request from a hypervisor) that is executed by the other processors 810A-810N of the computer system 800. However, in some embodiments the virtualization manager implemented by the offload card(s) 870A or 870B can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle(R), Microsoft(R), Sybase(R), IBM(R), etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    hosting, by a service within a service provider network, a database instance including a first listener for a first port and a second listener for a second port, the first listener supporting a first application-layer database message exchange protocol associated with a first type of database that supports a first query language dialect, the second listener supporting a second application-layer database message exchange protocol associated with a second type of database that supports a second query language dialect;
    establishing, via the first port, a first database session with a client using the first application-layer database message exchange protocol;
    receiving, via the first port, a first database statement originated by the client, wherein at least a portion of the first database statement is of the first query language dialect supported by the first type of database;
    executing, by a multi-dialect executor of the database instance, the first database statement;
    receiving, via the first port, a command originated by the client indicating a request to switch a current query language dialect, for the first database session, from the first query language dialect to the second query language dialect;
    receiving, via the first port, a second database statement originated by the client, wherein at least a portion of the second database statement is of the second query language dialect; and
    executing, by the multi-dialect executor of the database instance, the second database statement.

2. The computer-implemented method of claim 1, wherein the first application-layer database message exchange protocol comprises one of:
    tabular data stream (TDS) protocol;
    frontend/backend (FE/BE) protocol; or
    Oracle Net protocol.

3. The computer-implemented method of claim 1, wherein:
    the client comprises a client driver utilized by an application of a customer of the service provider network;
    the application was written to utilize the first type of database and use the first query language dialect;
    the database instance is executed with the service provider network; and
    the application was migrated to use the database instance.

4. A computer-implemented method comprising:
    provisioning, by a database service of a service provider network, a database instance for a user;
    establishing, via a first port of the database instance, a first database session with a client using a first application-layer database message exchange protocol associated with a first type of database that supports a first query language dialect;
    receiving, via the first port, a first database statement originated by the client, wherein at least a portion of the first database statement is of the first query language dialect supported by the first type of database;

executing, by a multi-dialect executor of the database instance, the first database statement;

receiving, via the first port, a command originated by the client indicating a request to switch a current query language dialect, for the first database session, from the first query language dialect to a second query language dialect;

receiving, via the first port, a second database statement originated by the client, wherein at least a portion of the second database statement is of a second query language dialect not supported by the first type of database; and executing, by the multi-dialect executor of the database instance, the second database statement.

5. The computer-implemented method of claim 4, wherein the first application-layer database message exchange protocol comprises one of:

tabular data stream (TDS) protocol;

frontend/backend (FE/BE) protocol; or

Oracle Net protocol.

6. The computer-implemented method of claim 4, further comprising:

establishing, via a second port of the database instance, a second database session using a second application-layer database message exchange protocol associated with a second type of database that supports the second query language dialect.

7. The computer-implemented method of claim 6, further comprising:

receiving, via the second port as part of the second database session, a third database statement of the second query language dialect; and executing, by the database instance, the third database statement.

8. The computer-implemented method of claim 6, wherein the database instance includes:

a first listener component implementing the first application-layer database message exchange protocol via the first port; and a second listener component implementing the second application-layer database message exchange protocol via the second port.

9. The computer-implemented method of claim 4, wherein executing the first database statement comprises parsing the first database statement based on the current query language dialect.

10. The computer-implemented method of claim 8, wherein executing the first database statement further comprises invoking an interpreter engine associated with the current query language dialect as part of executing at least a portion of the first database statement.

11. The computer-implemented method of claim 10, wherein the portion of the first database statement references a stored object.

12. The computer-implemented method of claim 4, wherein:

the client comprises a client driver utilized by an application of the user of the service provider network;

the application was written to utilize the first type of database and use the first query language dialect;

the database instance is executed with the service provider network; and the application was migrated to use the database instance.

13. The computer-implemented method of claim 12, wherein the second database statement references a function provided by a second type of database but not the first type of database.

14. The computer-implemented method of claim 4, wherein the database instance includes:

a first listener component implementing the first application-layer database message exchange protocol via the first port;

a second listener component implementing a second application-layer database message exchange protocol via a second port;

at least a first interpreter engine associated with the first type of database;

at least a second interpreter engine associated with a second type of database; and a parser.

15. A system comprising:

a first one or more electronic devices to implement a first service in a multi-tenant service provider network, the first service to implement at least a portion of an application that includes a client driver; and a second one or more electronic devices to implement a database service in the multi-tenant service provider network, the database service including instructions that upon execution cause the database service to:

provision, for a user of the service provider network, a database instance;

establish, via a first port of the database instance, a first database session with the client driver using a first application-layer database message exchange protocol associated with a first type of database that supports a first query language dialect;

receive, via the first port, a first database statement originated by the client driver, wherein at least a portion of the first database statement is of the first query language dialect supported by the first type of database;

execute, by a multi-dialect executor of the database instance, the first database statement;

receiving, via the first port, a command originated by the client indicating a request to switch a current query language dialect, for the first database session, from the first query language dialect to a second query language dialect;

receiving, via the first port, a second database statement originated by the client, wherein at least a portion of the second database statement is of a second query language dialect not supported by the first type of database; and executing, by the multi-dialect executor of the database instance, the second database statement.

16. The system of claim 15, wherein the database instance includes:

a first listener component implementing the first application-layer database message exchange protocol via the first port;

a second listener component implementing a second application-layer database message exchange protocol via a second port, the second application-layer database message exchange protocol being associated with a second type of database that supports a second query language dialect;

at least a first interpreter engine associated with the first type of database; and at least a second interpreter engine associated with the second type of database;

a parser.

17. The system of claim 15, wherein the first application-layer database message exchange protocol comprises one of:

tabular data stream (TDS) protocol;

frontend/backend (FE/BE) protocol; or

Oracle Net protocol.

18. The system of claim 15, wherein the database service further includes instructions that upon execution cause the database service to:

establish, via a second port of the database instance, a second database session using a second application-layer database message exchange protocol associated with a second type of database that supports the second query language dialect.

19. The system of claim 18, wherein the database service further includes instructions that upon execution cause the database service to:

receive, via the second port as part of the second database session, a third database statement of the second query language dialect; and execute, by the database instance, the third database statement.

20. The system of claim 18, wherein the database instance includes:

a first listener component implementing the first application-layer database message exchange protocol via the first port; and a second listener component implementing the second application-layer database message exchange protocol via the second port.

* * * * *